(12) United States Patent
Liu et al.

(10) Patent No.: US 8,456,458 B2
(45) Date of Patent: Jun. 4, 2013

(54) DISPLAY SYSTEM FOR GENERATING THREE-DIMENSIONAL IMAGES AND METHOD THEREOF

(75) Inventors: Sheng-Chi Liu, New Taipei (TW); Hsiu-Hung Lin, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 275 days.

(21) Appl. No.: 13/113,090

(22) Filed: May 23, 2011

(65) Prior Publication Data
US 2012/0242651 A1 Sep. 27, 2012

(30) Foreign Application Priority Data
Mar. 24, 2011 (TW) .............................. 100110099 A (51) Int. Cl.
G06F 3/038 (2006.01)
G09G 5/00 (2006.01)

(52) U.S. Cl.
USPC ....................................................... 345/204

(58) Field of Classification Search
USPC ................................ 345/204, 419, 96, 94, 87
See application file for complete search history.

(56) References Cited

U.S. PATENT DOCUMENTS

| | | | |
|---|---|---|---|
| 7,061,462 B1 * | 6/2006 | Pirš et al. | 345/96 |
| 7,242,396 B2 * | 7/2007 | Tai et al. | 345/204 |
| 8,199,139 B2 * | 6/2012 | Okazaki et al. | 345/204 |
| 2002/0067329 A1 | 6/2002 | Toko | |
| 2005/0174339 A1 * | 8/2005 | Takeshita et al. | 345/204 |

* cited by examiner

Primary Examiner — Fred Tzeng
(74) Attorney, Agent, or Firm — Winston Hsu; Scott Margo (57) ABSTRACT

A display system for generating three-dimensional images includes a liquid crystal panel, a driving voltage generation circuit, and a liquid crystal lens. The liquid crystal panel is used for receiving a three-dimensional image signal. The driving voltage generation circuit is used for generating a set of square-wave voltages and a direct current voltage alternately according to the three-dimensional image signal. The liquid crystal lens is used for adjusting refraction angles of a plurality of liquid crystals of the liquid crystal lens to output a three-dimensional image according to the set of square-wave voltages and the direct current voltage.

10 Claims, 13 Drawing Sheets

DISPLAY SYSTEM FOR GENERATING THREE-DIMENSIONAL IMAGES AND METHOD THEREOF

BACKGROUND OF THE INVENTION

1. Field of the Invention

The present invention is related to a display system for generating three-dimensional images and method thereof, and particularly to a display system for generating three-dimensional images that alternately utilizes a set of square-wave voltages and a direct current voltage to adjust refraction angles of a plurality of liquid crystals of a liquid crystal lens for suppressing an optical nebulization phenomenon and method thereof.

2. Description of the Prior Art

Figure 1:
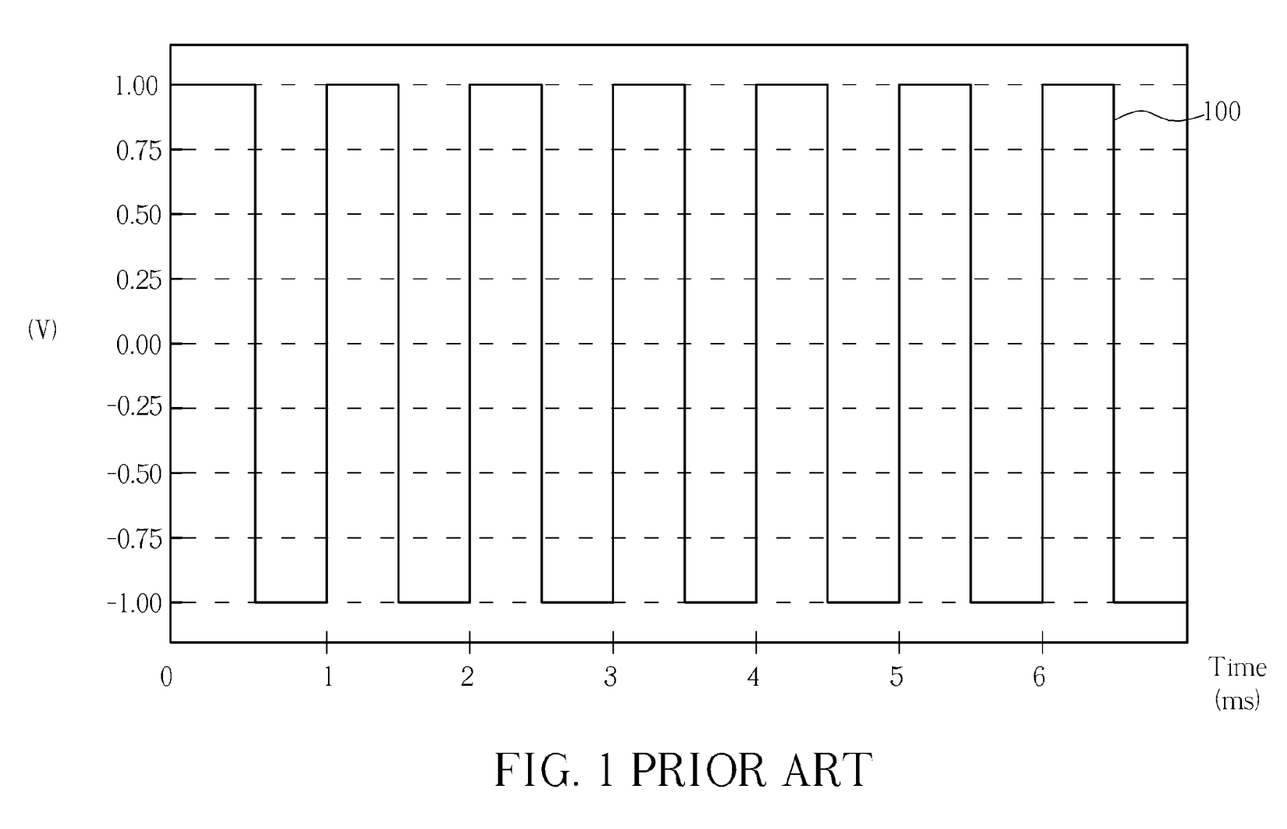
FIG. 1 is a diagram illustrating an alternating current square wave voltage for driving a plurality of liquid crystals of a traditional liquid crystal lens according to the prior art.

Please refer to FIG. 1. FIG. 1 is a diagram illustrating an alternating current square wave voltage 100 for driving a plurality of liquid crystals of a traditional liquid crystal lens according to the prior art. As shown in FIG. 1, a frequency of the alternating current square wave voltage 100 is 1 KHz and an amplitude of the alternating current square wave voltage 100 is 1V. But, frequency range of the alternating current square wave voltage 100 can be between 240 Hz and 1 KHz, and the amplitude of the alternating current square wave voltage 100 varying with different liquid crystal lenses changes from ±1V to ±100V.

Figure 2A:
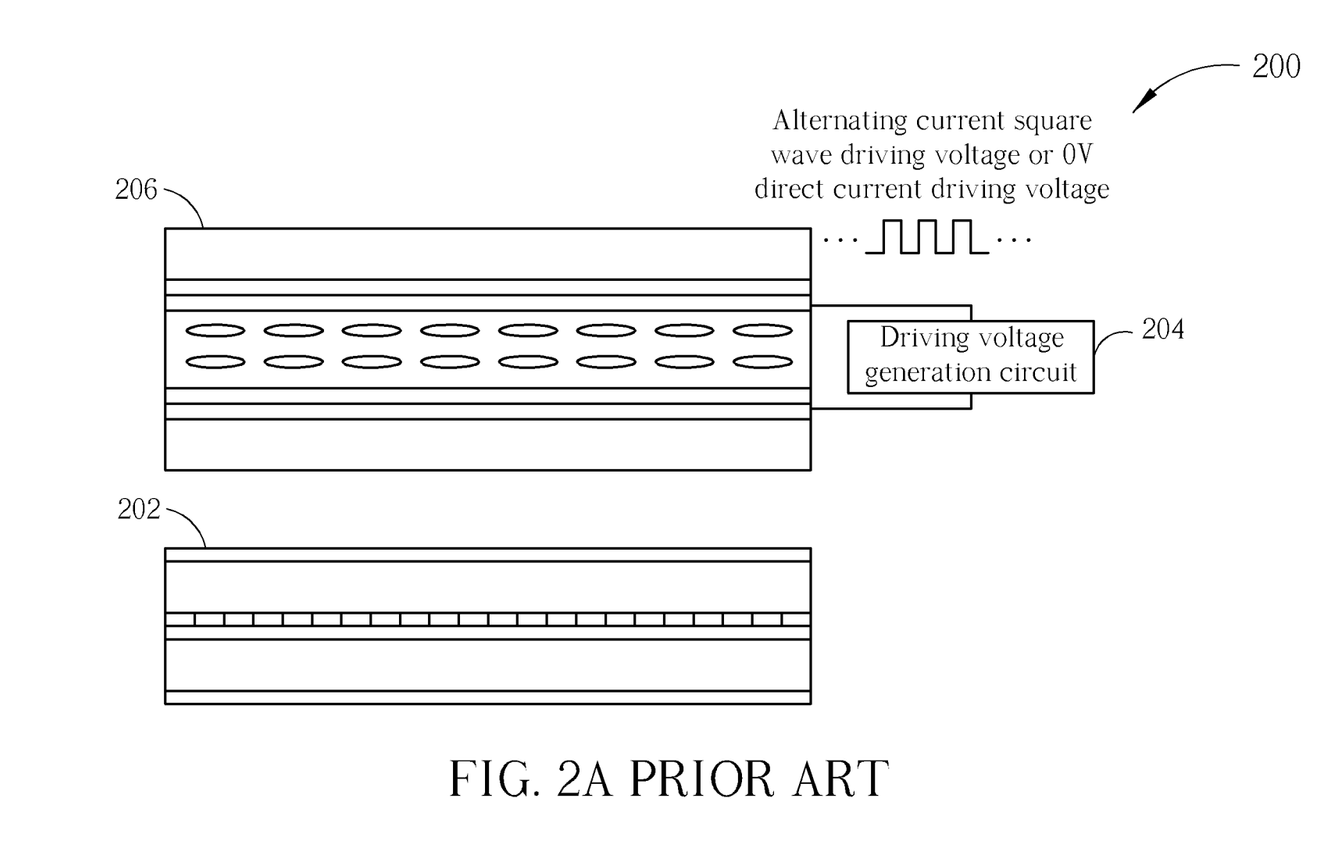
FIG. 2A is a diagram illustrating a display system according to the prior art.
Figure 2B:
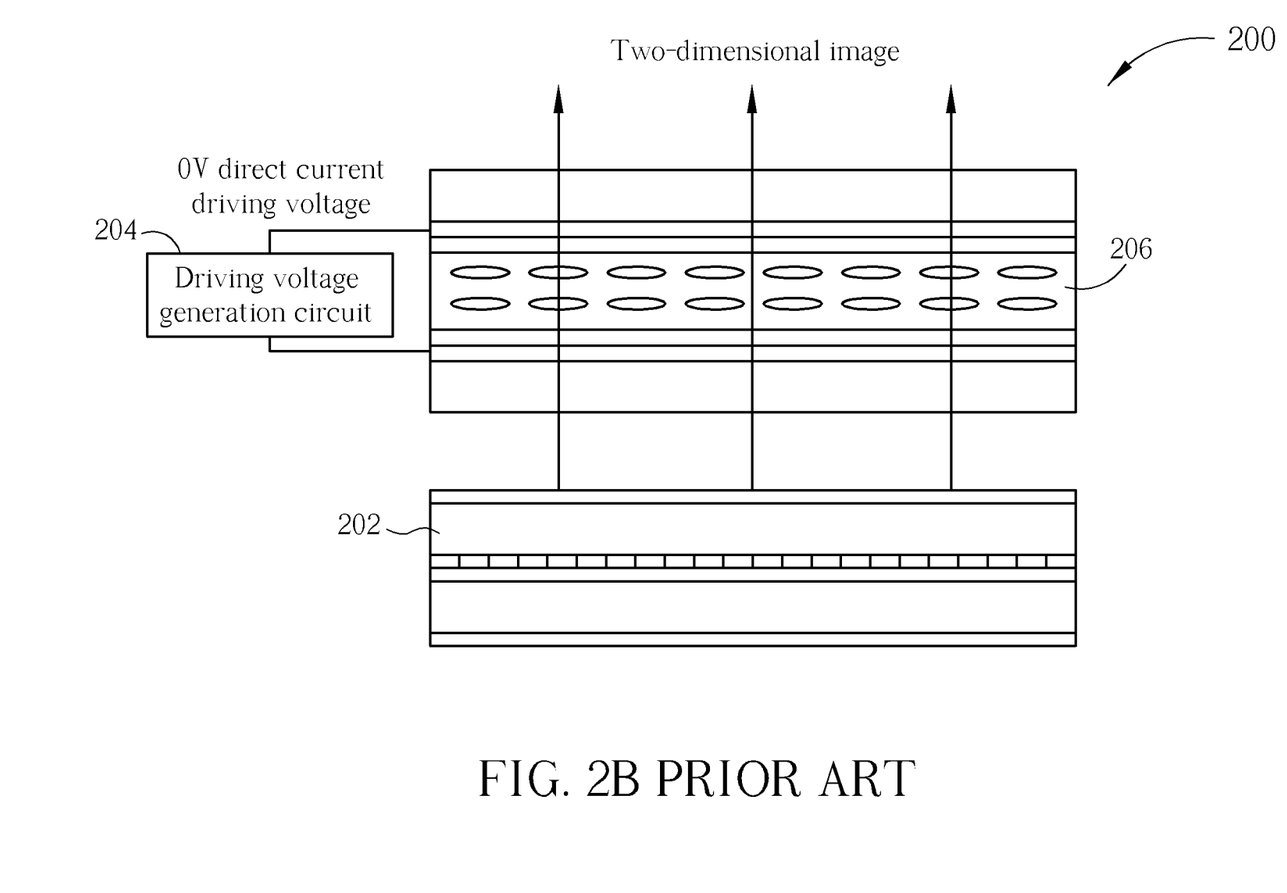
FIG. 2B is a diagram illustrating the display system outputting a two-dimensional image.
Figure 2C:
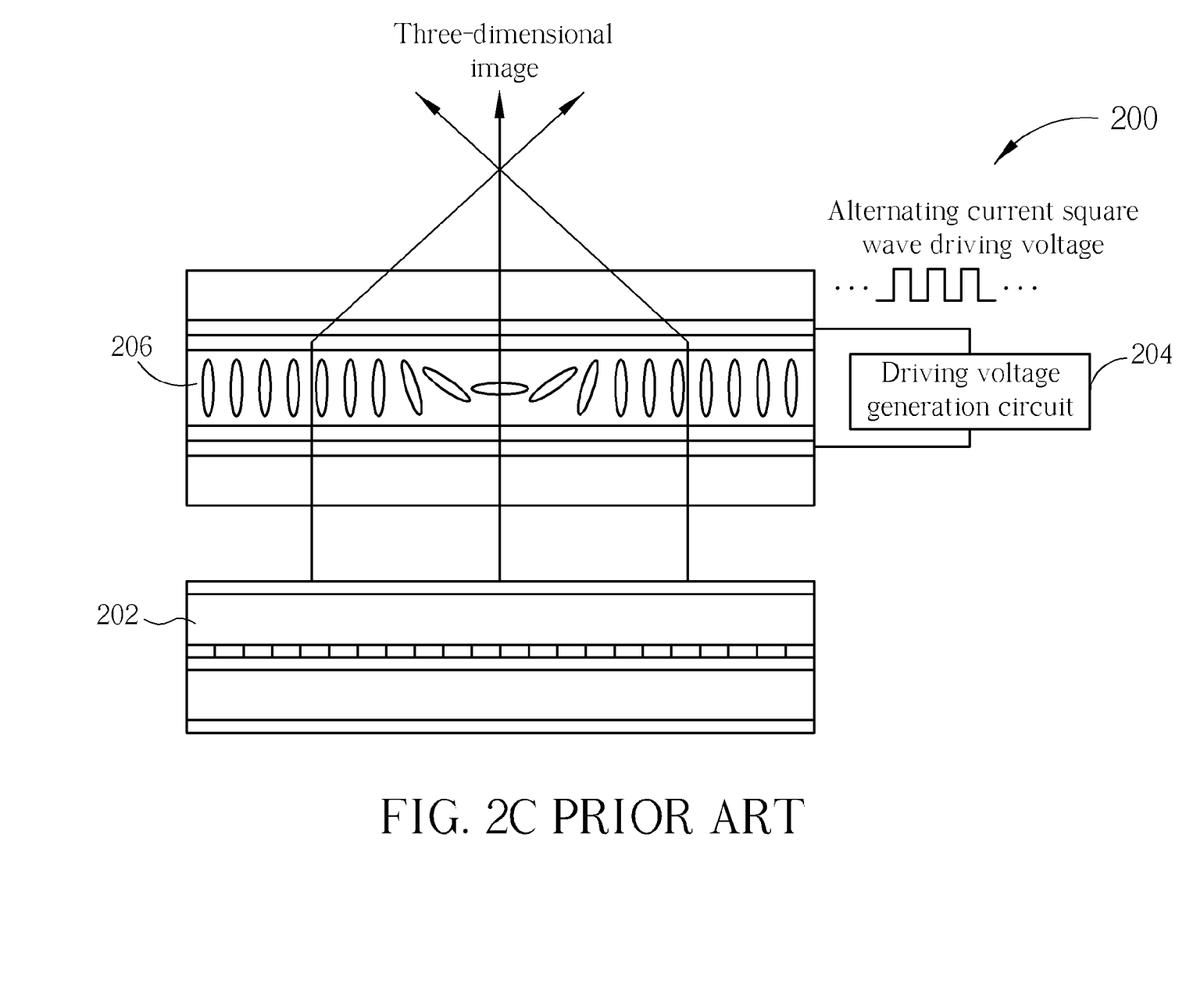
FIG. 2C is a diagram illustrating the display system outputting a three-dimensional image.

Please refer to FIG. 2A, FIG. 2B and FIG. 2C. FIG. 2A is a diagram illustrating a display system 200 according to the prior art, FIG. 2B is a diagram illustrating the display system 200 outputting a two-dimensional image, and FIG. 2C is a diagram illustrating the display system 200 outputting a three-dimensional image. As shown in FIG. 2A, the display system 200 includes a liquid crystal panel 202, a driving voltage generation circuit 204, and a liquid crystal lens 206. The liquid crystal panel 202 is used for receiving a three-dimensional image signal and a two-dimensional image signal, and outputting a three-dimensional image and a two-dimensional image. As shown in FIG. 2B, when the liquid crystal panel 202 outputs the two-dimensional image, the driving voltage generation circuit 204 generates a 0V direct current driving voltage according to the two-dimensional image signal. Then, the liquid crystal lens 206 outputs the two-dimensional image according to the 0V direct current driving voltage. That is to say, the plurality of liquid crystals of the liquid crystal lens 206 do not refract the two-dimensional image, so a left eye and a right eye of a watcher simultaneously receive the same two-dimensional image. As shown in FIG. 2C, when the liquid crystal panel 202 outputs the three-dimensional image, the driving voltage generation circuit 204 generates an alternating current square wave driving voltage according to the three-dimensional image signal. The liquid crystal lens 206 outputs the three-dimensional image according to the alternating current square wave driving voltage. That is to say, the plurality of liquid crystals of the liquid crystal lens 206 refracts a left eye image of the three-dimensional image to the left eye of the watcher, and a right eye image of the three-dimensional image to the right eye of the watcher.

Figure 3A:
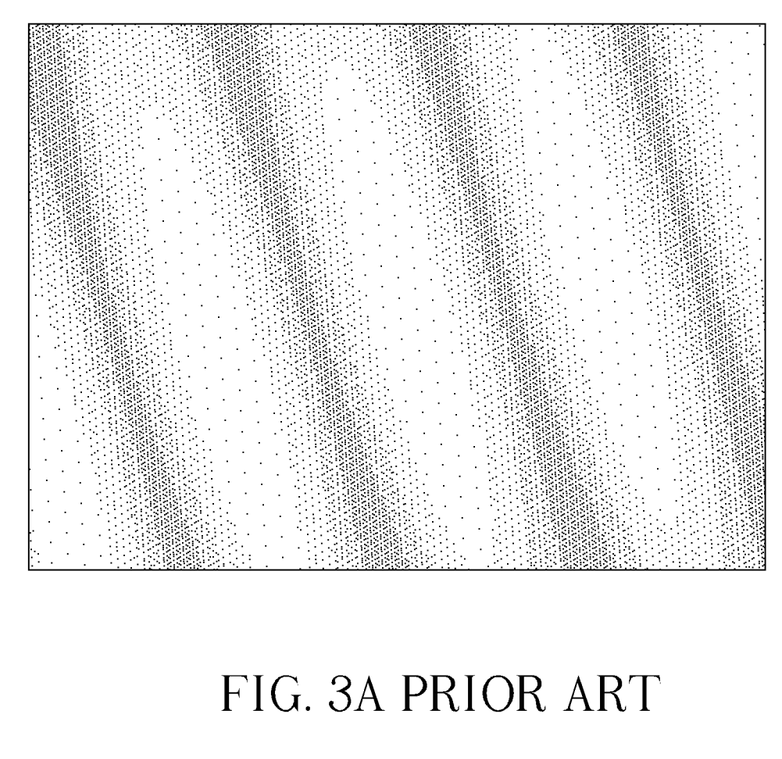
FIG. 3A is a diagram illustrating the display system displaying a Moire pattern when the display system displays the three-dimensional image.
Figure 3B:
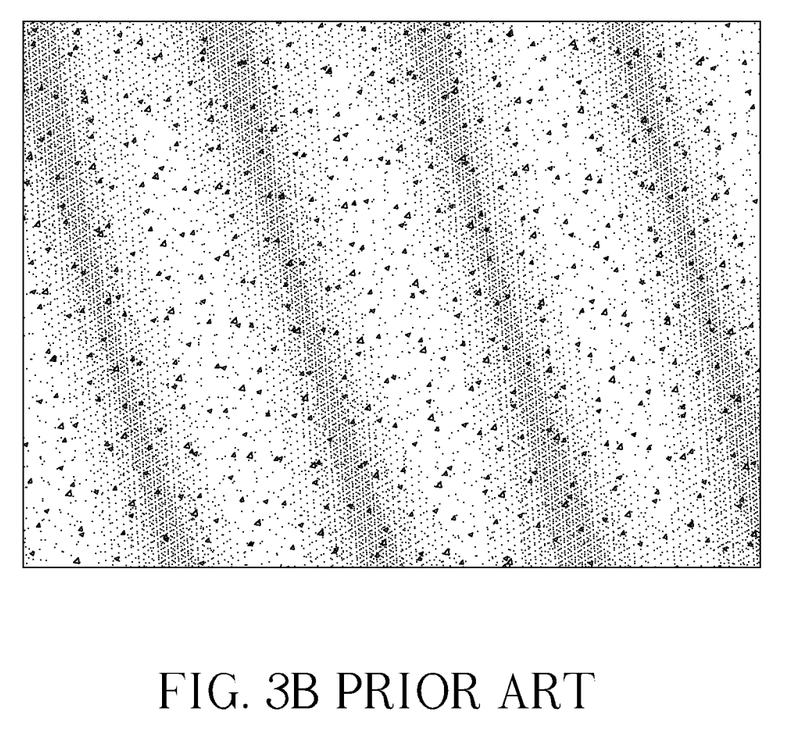
FIG. 3B is a diagram illustrating the display system generating an optical nebulization phenomenon when the display system displays the Moire pattern.
Figure 3C:
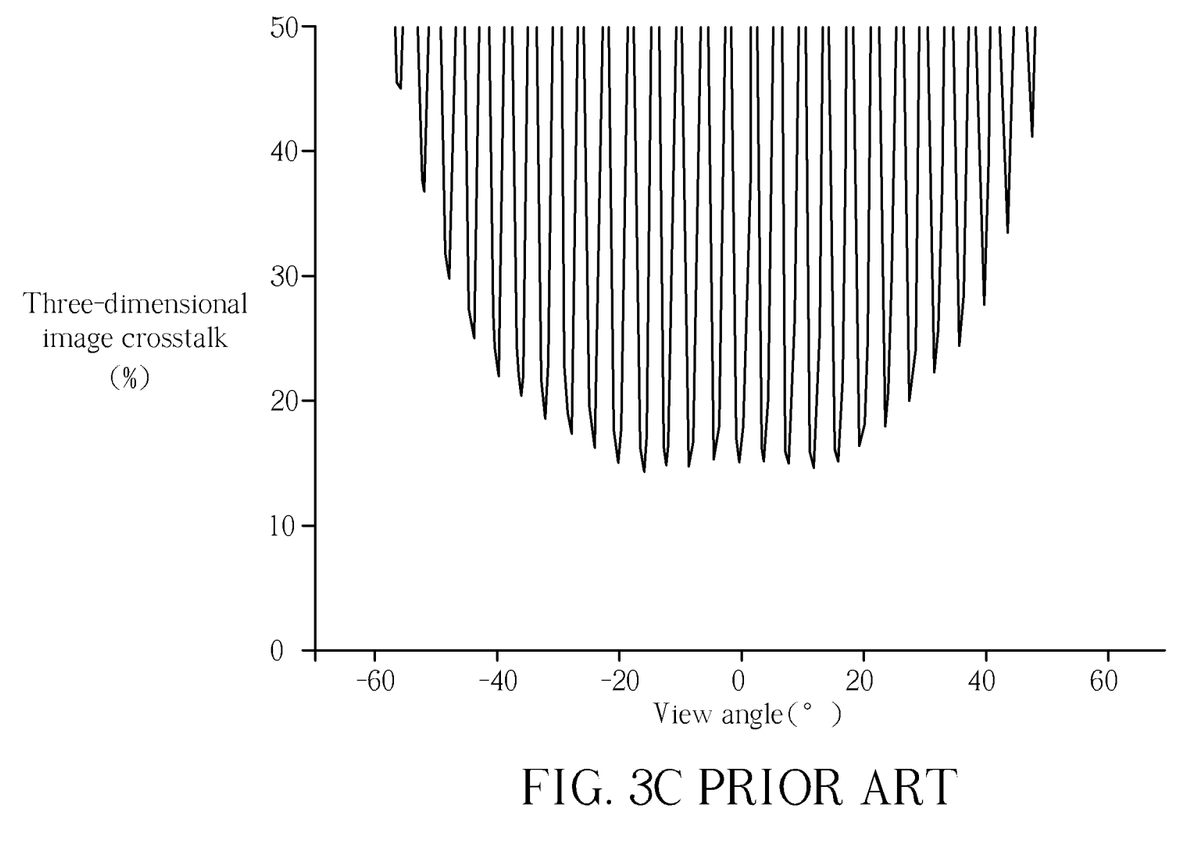
FIG. 3C is a diagram illustrating a relationship between three-dimensional image crosstalk and a view angle when the display system displays the three-dimensional image.

Please refer to FIG. 3A, FIG. 3B and FIG. 3C. FIG. 3A is a diagram illustrating the display system 200 displaying a Moire pattern when the display system 200 displays the three-dimensional image, FIG. 3B is a diagram illustrating the display system 200 generating an optical nebulization phenomenon when the display system 200 displays the Moire pattern, and FIG. 3C is a diagram illustrating a relationship between three-dimensional image crosstalk and a view angle when the display system 200 displays the three-dimensional image. As shown in FIG. 3A, when the left eye of the watcher is located at a right eye image area of the three-dimensional image displayed by the display system 200, and the right eye of the watcher is located at a left eye image area of the three-dimensional image displayed by the display system 200, the watcher can see the Moire pattern. As shown in FIG. 3B and FIG. 3C, after the display system 200 displays the Moire pattern for a period of time, the three-dimensional image displayed by the liquid crystal panel 202 through the liquid crystal lens 206 may show the optical nebulization phenomenon, resulting in the three-dimensional image crosstalk being increased. Therefore, the prior art for driving the liquid crystal lens 206 according to the alternating current square wave driving voltage may worsen quality of the three-dimensional image displayed by the liquid crystal panel 202 through the liquid crystal lens 206.

SUMMARY OF THE INVENTION

An embodiment provides a display system for generating three-dimensional images. The display system includes a liquid crystal panel, a driving voltage generation circuit, and a liquid crystal lens. The liquid crystal panel is used for receiving a three-dimensional image signal. The driving voltage generation circuit is used for generating a set of square-wave voltages and a direct current voltage alternately according to the three-dimensional image signal. The liquid crystal lens is used adjusting refraction angles of a plurality of liquid crystals of the liquid crystal lens to output a three-dimensional image according to the set of square-wave voltages and the direct current voltage.

Another embodiment provides a method for displaying three-dimensional images. The method includes receiving a three-dimensional image signal; generating a set of square-wave voltages and a direct current voltage alternately according to the three-dimensional image signal; a liquid crystal lens adjusting refraction angles of a plurality of liquid crystals of the liquid crystal lens to output a three-dimensional image according to the set of square-wave voltages and the direct current voltage.

The present invention provides a display system for generating three-dimensional images and method thereof. The display system and method thereof utilize a driving voltage generation circuit to generate a set of square-wave voltages and a direct current voltage alternately according to a three-dimensional image signal. Then, a liquid crystal lens alternately adjusts refraction angles of a plurality of liquid crystals of the liquid crystal lens according to the set of square-wave voltages and the direct current voltage to output the three-dimensional image. Therefore, the present invention not only reduces three-dimensional image crosstalk but also does not generate an optical nebulization phenomenon when the display system displays a Moire pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
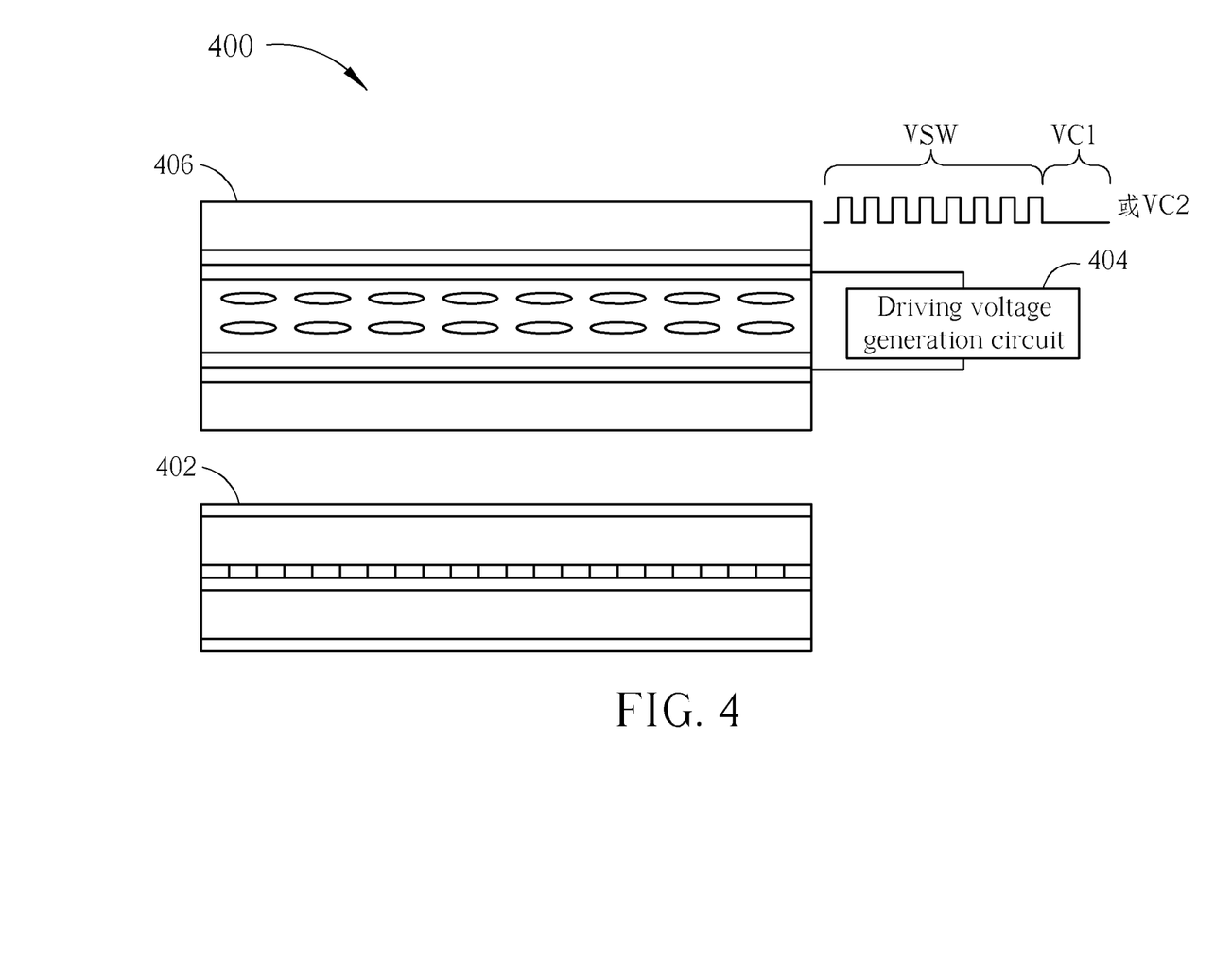
FIG. 4 is a diagram illustrating a display system for generating three-dimensional images according to an embodiment.
Figure 5A:
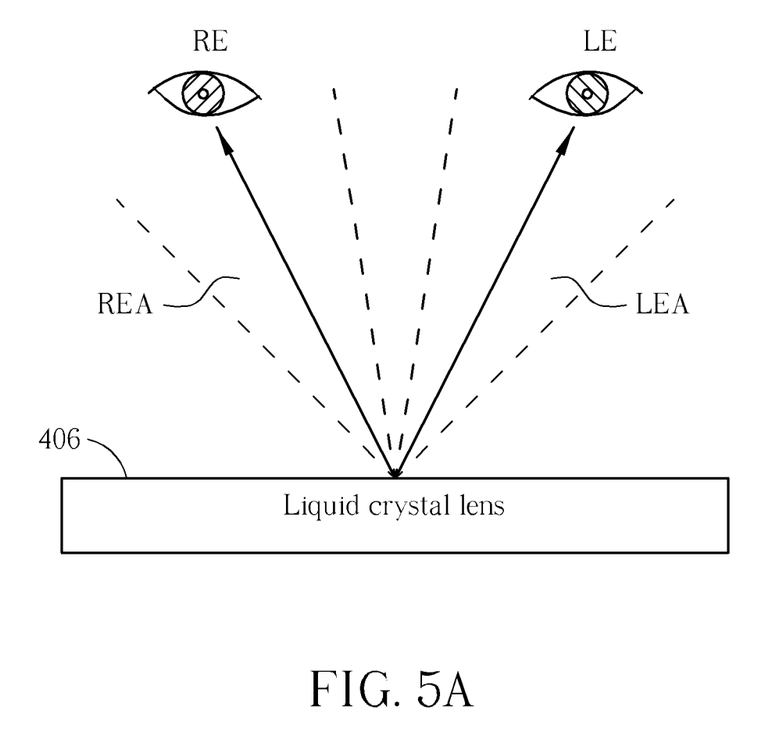
FIG. 5A is a diagram illustrating the liquid crystal lens being a two-view lens.
Figure 5B:
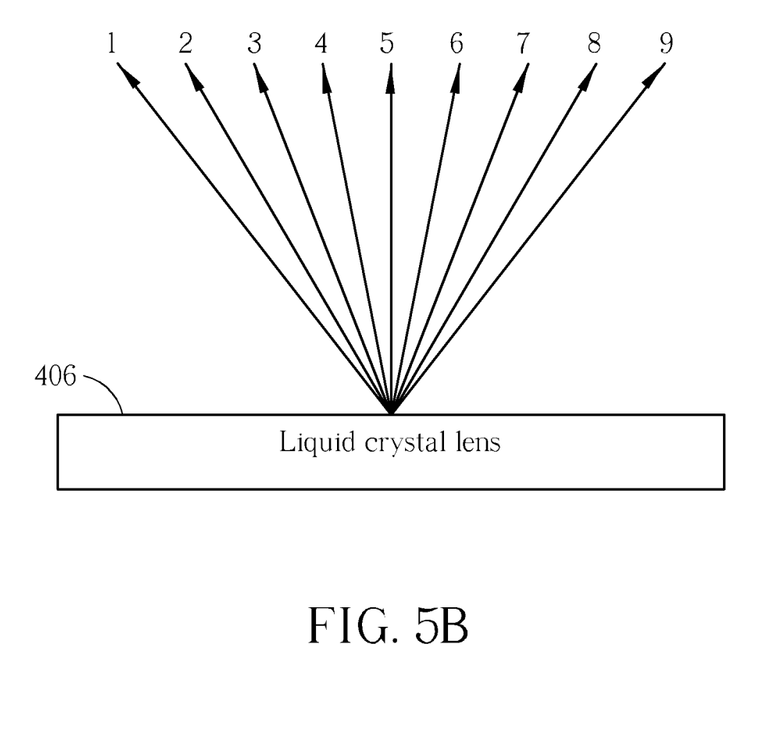
FIG. 5B is a diagram illustrating the liquid crystal lens being a multi-view lens.

Please refer to FIG. 4. FIG. 4 is a diagram illustrating a display system 400 for generating three-dimensional images according to an embodiment. The display system 400 includes a liquid crystal panel 402, a driving voltage generation circuit 404, and a liquid crystal lens 406. The liquid crystal panel 402 is used for receiving a three-dimensional image signal and a two-dimensional image signal. The driving voltage generation circuit 404 is used for generating a set of square-wave voltages VSW and a direct current voltage VC1 alternately according to the three-dimensional image signal, and generating a direct current driving voltage VC2 according to the two-dimensional image signal. The direct current driving voltage VC2 is a 0 volt direct current voltage, and the direct current voltage VC1 is also a 0 volt direct current voltage. The liquid crystal lens 406 is used for adjusting refraction angles of a plurality of liquid crystals of the liquid crystal lens 406 to output a three-dimensional image according to the set of square-wave voltages VSW and the direct current voltage VC1, where the three-dimensional image includes a left eye image and a right eye image. In addition, the liquid crystal lens is further used for outputting a two-dimensional image according to the direct current driving voltage VC2. In addition, please refer to FIG. 5A and FIG. 5B. FIG. 5A is a diagram illustrating the liquid crystal lens 406 being a two-view lens, and FIG. 5B is a diagram illustrating the liquid crystal lens 406 being a multi-view lens. As shown in FIG. 5A, the liquid crystal lens 406 projects the left eye image of the three-dimensional image to a left eye image area LEA in space and the right eye image of the three-dimensional image to a right eye image area REA in space, respectively. Therefore, when a left eye and a right eye of a watcher are located at the left eye image area LEA and the right eye image area REA, respectively, the watcher can sense a three-dimensional image. As shown in FIG. 5B, views 1, 3, 5, 7, 9 correspond to a left eye image of a three-dimensional image, and views 2, 4, 6, 8 correspond to a right eye image of the three-dimensional image. Therefore, when the liquid crystal lens 406 is the multi-view lens, the display system 400 can output the three-dimensional image to a plurality of watchers simultaneously. But, the present invention is not limited to the views 1, 3, 5, 7, 9 corresponding to the left eye image of the three-dimensional image, the views 2, 4, 6, 8 corresponding to the right eye image of the three-dimensional image, and the 9 views.

Figure 6:
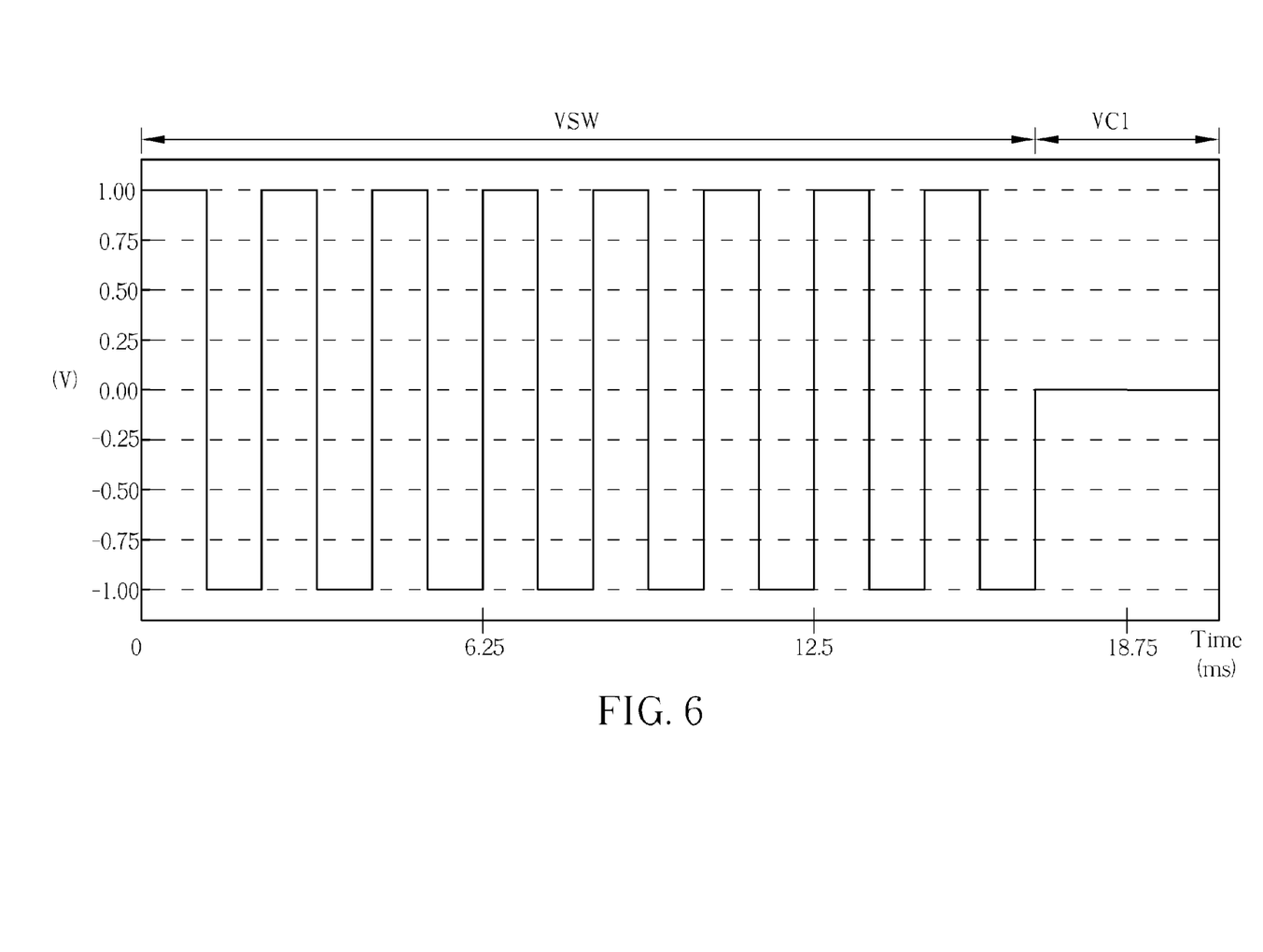
FIG. 6 is a diagram illustrating the driving voltage generation circuit generating the set of square-wave voltages and the direct current voltage alternately.

Please refer to FIG. 6. FIG. 6 is a diagram illustrating the driving voltage generation circuit 404 alternately generating the set of square-wave voltages VSW and the direct current voltage VC1. As shown in FIG. 6, the set of square-wave voltages VSW has 8 square waves, and a frequency of the square wave is 480 Hz. That is to say, length of the set of square-wave voltages VSW is 1/60 second. After the set of square-wave voltages VSW, the driving voltage generation circuit 404 generates the direct current voltage VC1 with length 1/240 second. Therefore, as shown in FIG. 6, a ratio of the length of the direct current voltage VC1 to the length of the set of square-wave voltages VSW is 2/8. But, the present invention is not limited to the ratio of the length of the direct current voltage VC1 to the length of the set of square-wave voltages VSW being 2/8, and the set of square-wave voltages VSW having 8 square waves. Any alternate driving of the liquid crystal lens to display the three-dimensional image according to a set of square-wave voltages and a direct current voltage falls within the scope of the present invention.

Figure 7:
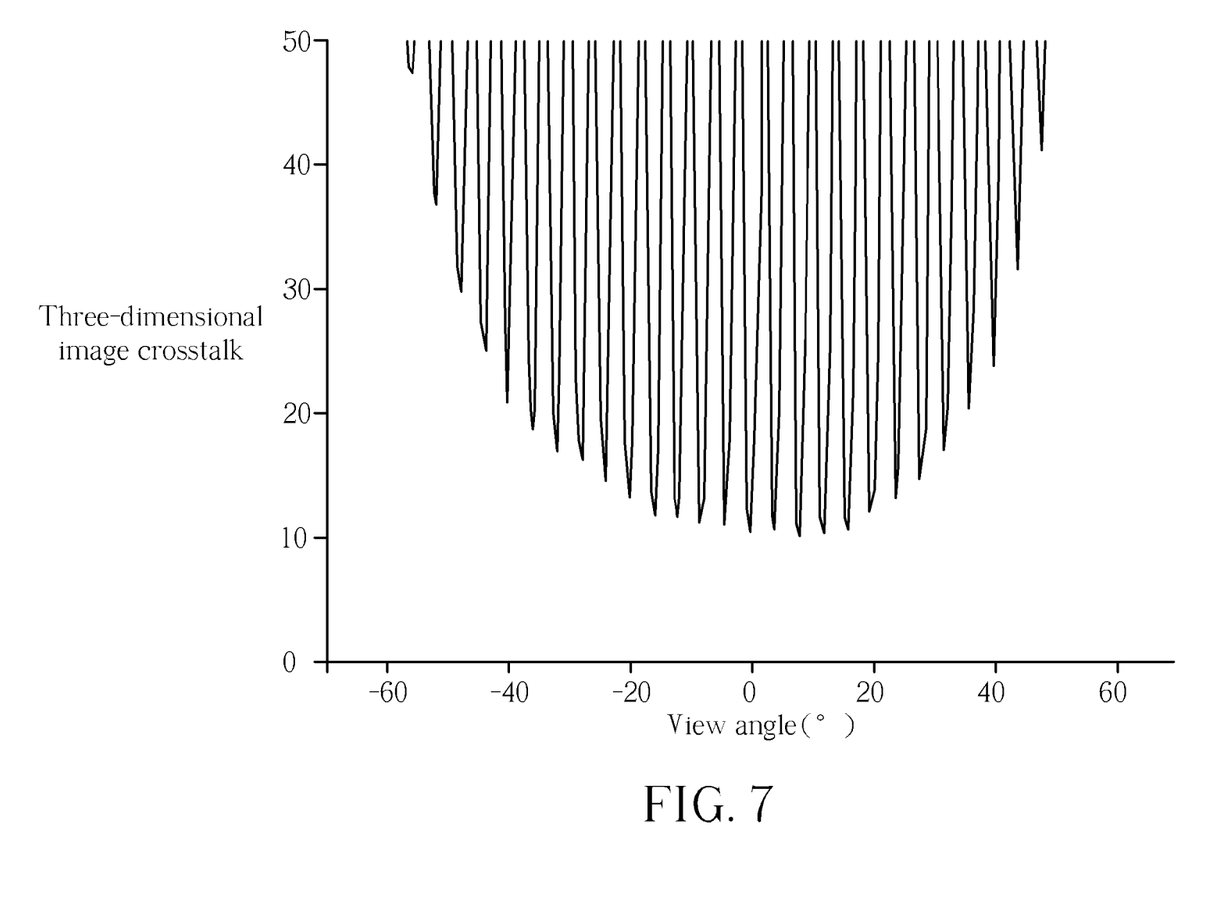
FIG. 7 is a diagram illustrating a relationship between three-dimensional image crosstalk and a view angle when the display system displays the three-dimensional image.

Please refer to FIG. 7. FIG. 7 is a diagram illustrating a relationship between three-dimensional image crosstalk and a view angle when the display system 400 displays the three-dimensional image. Compared to FIG. 3C, the display system 400 not only reduces the three-dimensional image crosstalk, but also does not generate an optical nebulization phenomenon when the display system 400 displays a Moire pattern.

Figure 8:
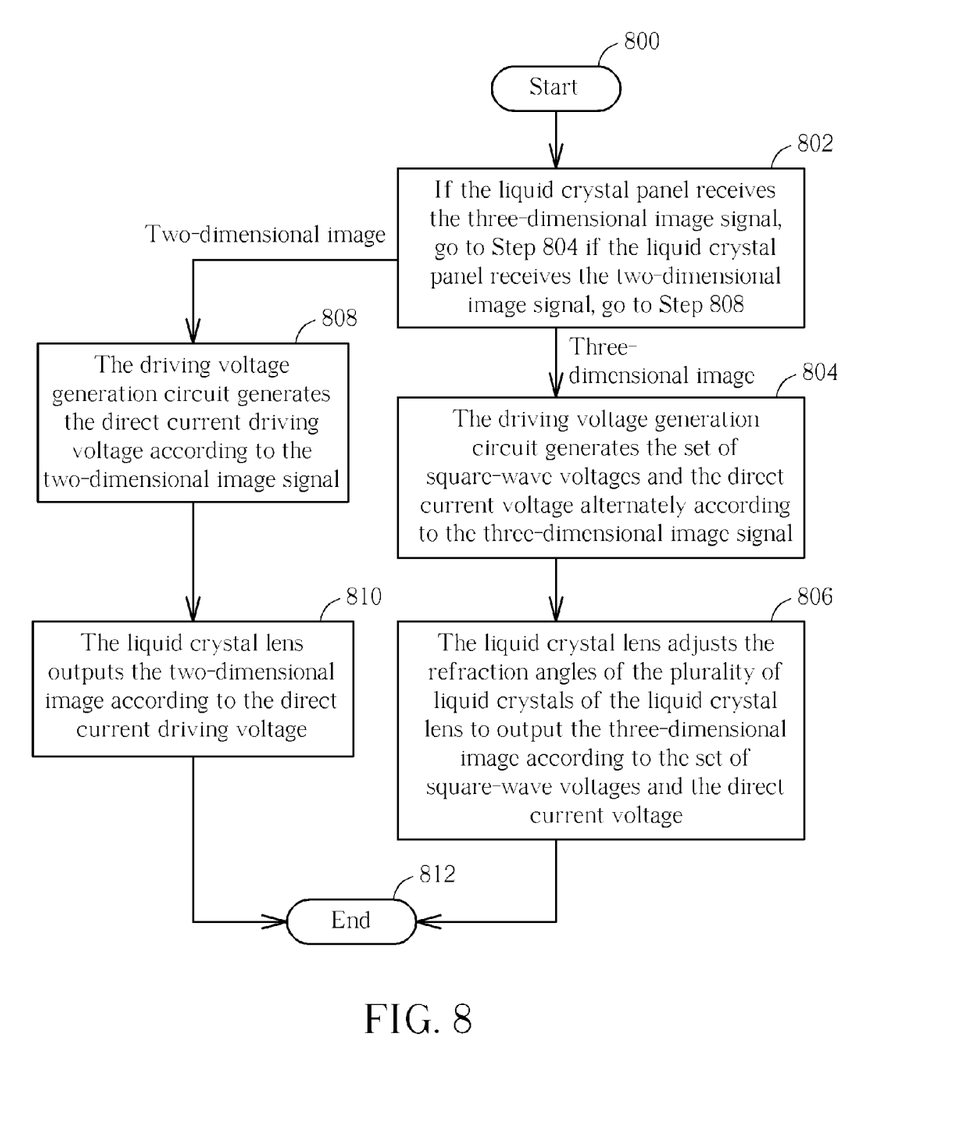
FIG. 8 is a flowchart illustrating a method for displaying three-dimensional images according to another embodiment.

Please refer to FIG. 8. FIG. 8 is a flowchart illustrating a method for displaying three-dimensional images according to another embodiment. The method in FIG. 8 uses the display system 400 in FIG. 4 to illustrate the method. Detailed steps are as follows:

Step 800: Start.

Step 802: If the liquid crystal panel 402 receives the three-dimensional image signal, go to Step 804; if the liquid crystal panel 402 receives the two-dimensional image signal, go to Step 808.

Step 804: The driving voltage generation circuit 404 generates a set of square-wave voltages VSW and the direct current voltage VC1 alternately according to the three-dimensional image signal.

Step 806: The liquid crystal lens 406 adjusts the refraction angles of the plurality of liquid crystals of the liquid crystal lens 406 to output the three-dimensional image according to the set of square-wave voltages VSW and the direct current voltage VC1; go to Step 812.

Step 808: The driving voltage generation circuit 404 generates the direct current driving voltage VC2 according to the two-dimensional image signal.

Step 810: The liquid crystal lens 406 outputs the two-dimensional image according to the direct current driving voltage VC2; go to Step 812.

Step 812: End.

In Step 802, the three-dimensional image includes the left eye image and the right eye image, and the liquid crystal panel 402 is the two-view lens or the multi-view lens. In Step 804, the direct current voltage VC1 is the 0 volt direct current voltage. In Step 806, the liquid crystal lens 406 utilizes the set of square-wave voltages VSW and the direct current voltage VC1 alternately to adjust the refraction angles of the plurality of liquid crystals of the liquid crystal lens 406 for suppressing the optical nebulization phenomenon. In Step 808, the direct current driving voltage VC2 is the 0 volt direct current voltage.

To sum up, the display system for generating the three-dimensional images and method thereof utilize the driving voltage generation circuit to generate the set of square-wave voltages and the direct current voltage alternately according to the three-dimensional image signal. Then, the liquid crystal lens alternately adjusts the refraction angles of the plurality of liquid crystals of the liquid crystal lens according to the set of square-wave voltages and the direct current voltage to output the three-dimensional image. Therefore, the present invention not only reduces the three-dimensional image crosstalk but also does not generate the optical nebulization phenomenon when the display system displays the Moire pattern.

Those skilled in the art will readily observe that numerous modifications and alterations of the device and method may be made while retaining the teachings of the invention.

What is claimed is:

1. A display system for generating three-dimensional images, the display system comprising:
   a liquid crystal panel for receiving a three-dimensional image signal;
   a driving voltage generation circuit for generating a set of square-wave voltages and a direct current voltage alternately according to the three-dimensional image signal; and
   a liquid crystal lens for adjusting refraction angles of a plurality of liquid crystals of the liquid crystal lens to output a three-dimensional image according to the set of square-wave voltages and the direct current voltage.

2. The display system of claim 1, wherein the liquid crystal panel is further used for receiving a two-dimensional image signal, the driving voltage generation circuit is further used for generating a direct current driving voltage according to the two-dimensional image signal, and the liquid crystal lens is further used for outputting a two-dimensional image according to the direct current driving voltage.

3. The display system of claim 2, wherein the direct current driving voltage is 0 volt direct current voltage.

4. The display system of claim 1, wherein the direct current voltage is 0 volt direct current voltage.

5. The display system of claim 1, wherein the liquid crystal lens is a multi-view lens.

6. The display system of claim 1, wherein the liquid crystal lens is a two-view lens.

7. The display system of claim 1, wherein the three-dimensional image comprises a left eye image and a right eye image.

8. A method for displaying three-dimensional images, the method comprising:
   receiving a three-dimensional image signal;
   generating a set of square-wave voltages and a direct current voltage alternately according to the three-dimensional image signal; and
   a liquid crystal lens adjusting refraction angles of a plurality of liquid crystals of the liquid crystal lens to output a three-dimensional image according to the set of square-wave voltages and the direct current voltage.

9. The method of claim 8, wherein the three-dimensional image comprises a left eye image and a right eye image.

10. The method of claim 8, further comprising:
    receiving a two-dimensional image signal;
    generating a direct current driving voltage according to the two-dimensional image signal; and
    the liquid crystal lens outputting a two-dimensional image according to the direct current driving voltage.

* * * * *